July 3, 1962

E. HAVNEN 3,042,136

ELECTRONIC SPEED CONTROL SYSTEM FOR MOTOR VEHICLES AND ROADS

Filed Dec. 18, 1959

INVENTOR.
Egil Havnen
BY *[signature]*
ATTORNEY.

July 3, 1962

E. HAVNEN 3,042,136

ELECTRONIC SPEED CONTROL SYSTEM FOR MOTOR VEHICLES AND ROADS

Filed Dec. 18, 1959

*INVENTOR.*
Egil Havnen

BY

ATTORNEY.

United States Patent Office 3,042,136
Patented July 3, 1962

3,042,136
ELECTRONIC SPEED CONTROL SYSTEM FOR MOTOR VEHICLES AND ROADS
Egil Havnen, 464 Woodcliffe Ave., North Bergen, N.J.
Filed Dec. 18, 1959, Ser. No. 860,542
6 Claims. (Cl. 180—82.1)

This invention relates to speed control systems and devices and has for its main object the control by the police authorities, and in some instances by the owner, of the speed at which vehicles or automobiles are driven on all thruways, highways and elsewhere.

This object and other objects are attained in a system which, briefly stated, includes a conventional automobile vehicle with the usual braking system controlled by a brake lever or pedal. The usual speedometer found in the vehicle is modified to include an electric switch adapted to close when a predetermined vehicle speed is reached so as to set the braking system until the predetermined speed is no longer attained.

In the accompanying drawing showing, by way of example, two of many possible embodiments of the invention, FIGURE 1 is a schematic representation of one form of the invention.

Figure 1:
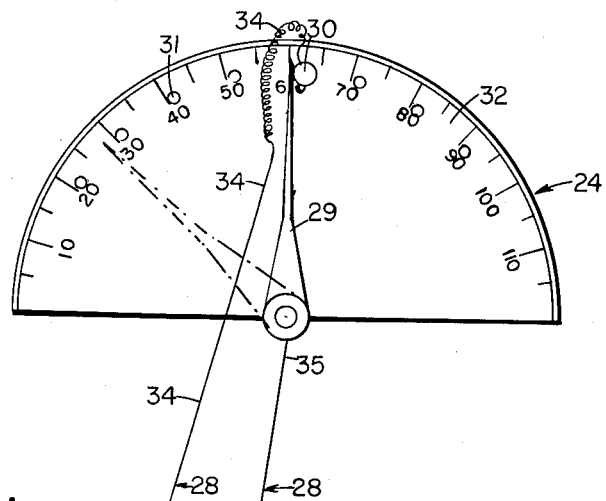
Figure 1:
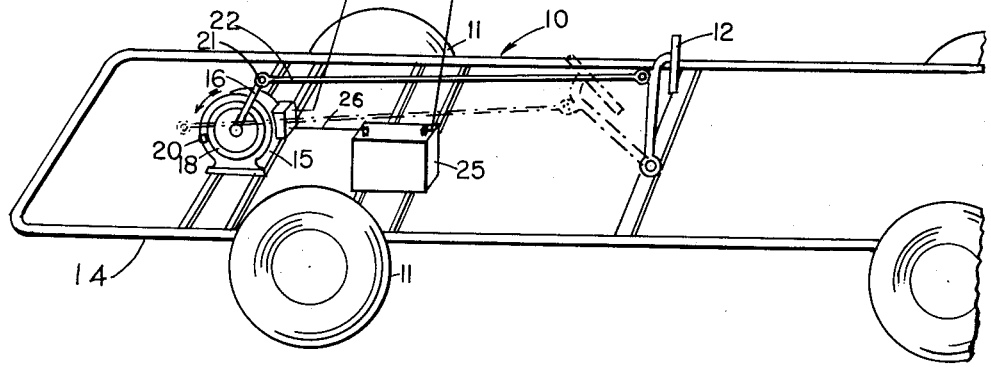

The invention is shown in connection with a vehicle chassis shown schematically and generally as 10, having the usual wheels 11 provided with a braking means including a foot pedal 12. On the forward portion 14 of the chassis there is mounted a motor 15 for actuating a lever 16 so as to turn the lever counterclockwise as shown by the arrow. Motion is imparted to the lever 16 through a friction device 18 carried on the shaft 19 of the motor, which friction device 18 may be of well known type and need not be described in detail. Movement of the lever 16 is restricted to less than one turn by means of a stop 20 against which the lever engages at the extreme position of turning.

The outer end 21 of the lever is connected by means of a link 22 to the foot pedal 12. When the motor is caused to turn in the direction of the arrow, the lever 16 will be dragged counterclockwise and pull the link 22 forward so as to depress the pedal 12 and effect braking of the vehicle by the normal conventional braking system therefor. The friction device will permit enough rotation after the stop 20 is engaged to prevent burning out of the motor.

When the motor ceases to apply any torque, the normal bias of the foot pedal retracts the link 22 and the lever 16.

The control of the motor 15 is through action of a generally conventional speedometer 24. The motor is powered by battery 25 through conductors 26 and 28. Interposed in the conductor 28 is a switch having as element a conventional conductive speedometer hand 29 and a conductive plug 30 to be selectively inserted in one of the plurality of spaced holes 31 lying on the arc of the speedometer scale 32.

The plug 30 is inserted in a predetermined one of the holes 31 according to the maximum speed which the vehicle is to attain. Position of the plug on the arc of the scale might be, say, near to 25 miles per hour index line if the vehicle is a truck and is to be operated at a reduced speed. However, if it be a passenger car the plug 30 might be inserted in a hole near the 65 mile per hour index line and so limit the passenger car to a speed of about 65 miles per hour. The location of the plug on the arc will normally be determined by the owner of the vehicle or by the police authorities, depending on the conditions of use to which the vehicle is to be put with respect to safe speeds for such use.

Leads 34 and 35 from the plug 30 and the hand 29 are shown interconnected in the conductor 28.

In operation, as the speed of the vehicle increases up to the predetermined amount for which the plug 30 is set, the speedometer pointer 29 moves in the normal clockwise direction until it comes in contact with the plug 30 whereupon the circuit including the battery 25, the conductor 28 and the motor 15 is completed and the motor turns the lever forward, thus applying the brake. Ordinarily the application of the brake will slow the vehicle down quickly so that the circuit is soon broken by the retraction of the speedometer arm. However if the vehicle is on a downgrade the motor may continue to turn, but limit of movement of the lever 16 is restricted by the stop 20 and the lever will then slip in frictional engagement with the motor.

Figure 2:
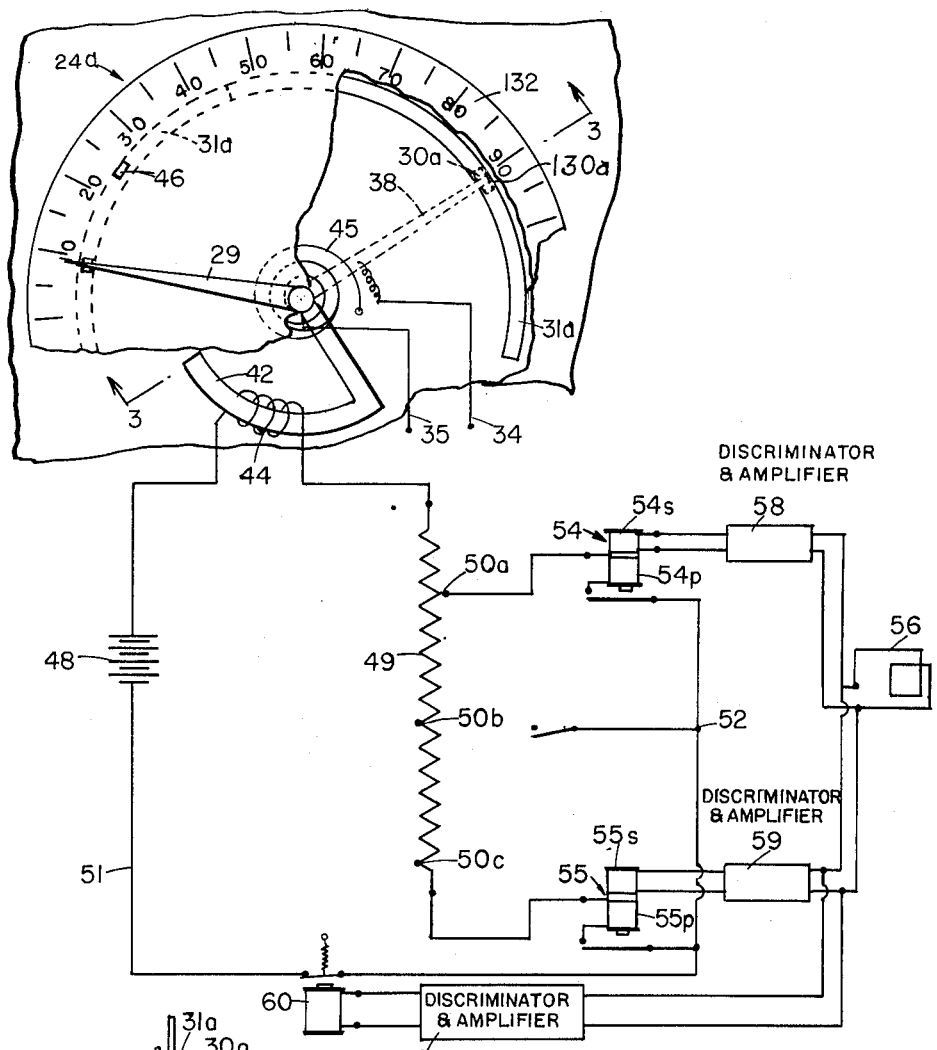
FIGURE 2 is a representation of another form of the invention.
Figure 3:
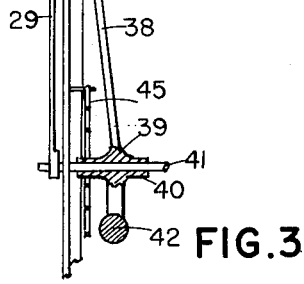
FIGURE 3 is a sectional view of a speedometer as shown in FIGURE 2 the section being taken along the line 3—3 looking in the direction of the arrow of said line.

The form of the invention shown in FIGURE 2 is one in which the permissible speed may be varied by remote control, as from a roadside station. The speedometer 24a is much the same as that of 24 except provision is made for a variation in the point of contact made by the hand 29. In the speedometer 24a, the same leads 34 and 35 are shown, the latter being connected to the hand. However the lead 34 is connected to an angularly movable arcuate contact member 30a disposed in a slotted arcuate groove or depression 31a in the scale plate 132.

The contact member 30a is moved by a lever arm 38 passing through a slot 37 in the depression 31a and mounted for rotation on a hub 39 on the sleeve 40, which sleeve receives therein a shaft 41 carrying the hand 29. The lever 38 and its hub are turned by armature 42 fast on the hub and in the field of a solenoid coil 44. The lever arm 38, armature, and coil are quite similar to well known combinations used in voltmeters so that the position of the contact member 30a and the lever 38 will be determined by the potential difference applied to the coil 44. As in volt meters, the lever 38 is biased to return counterclockwise by a spring 45, the extreme counterclockwise movement being limited by a stop 46 in the groove 31a. The position of this stop may be determined by the police authorities and fixed to correspond to some safe driving speed, say, 25 miles per hour. In the example shown, the speed below 25 miles per hour will not be regulated by remote control, but a speed in excess thereof may be so regulated.

Since the position of the contact member 30a will vary with the degree of potential applied to the coil 44, driving speed above, say, 25 miles per hour may be regulated by predetermining the potential across the coil. For this purpose a source of constant current, such as a battery 48, is connected to the coil through a resistance 49 having taps 50a, 50b, 50c so that a portion of the resistance 49 may be cut in or out of the circuit and so determine the potential across the coil.

In the drawing only two taps 50a and 50c are shown for use. Of course it is apparent that any number of taps may be provided for use. Connecting one side of the battery 48 and the resistor there is a conductor 51 which is selectively connected to various of the taps by means such as various normally open relays, such as those shown and designated 54 and 55, which are of the locking-in type and being held in closed position by primary windings 54$^P$ and 55$^P$. The relays are initially closed by energizing their respective secondaries 54$^S$ and 55$^S$ by impulses of current due to a signal from wayside stations which will be described later. Obviously other relays can be provided for connection to other taps. An antenna 56 is carried on the vehicle and receives signals from such stations but each relay responds only to a given frequency received by the antenna. In order that these different frequencies may so operate the relays, discriminators and amplifiers 58 and 59 are connected to the respective relays 54 and 55. After the antenna 56 receives signals intended to energize the secondaries 54$^S$ and 55$^S$ the relays will remain closed.

Suppose for instance the characteristics of the system are such that the closing of relay 54 will swing the contact member so that its end 130a remains near the 65 mile position. The vehicle will have freedom of speed variation anywhere up to 65 miles per hour before the brakes are set by the motor 15. If the relay 55 is closed and relay 54 is open the potential across the coil 44 will be less, for now all of resistance 49 is thrown in, and the contact member end 130a will be carried by the spring 45 to, say, 45 mile position. For opening the locked-in relay 54, current in conductor 51 is broken by opening the normally closed relay 60, the latter being energized selectively with respect to an appropriate signal by means of a discriminator 61. After this momentary opening, the relay 55 can be closed by an appropriate signal to hold the vehicle speed at 45 miles per hour.

For slow speed, say 25 miles per hour, contact member 30a will be against stop 46 and so limit the speed to 25 miles per hour. Of course stop 46 can be set at even lower speed if general use of the vehicle should require it.

Figure 4:
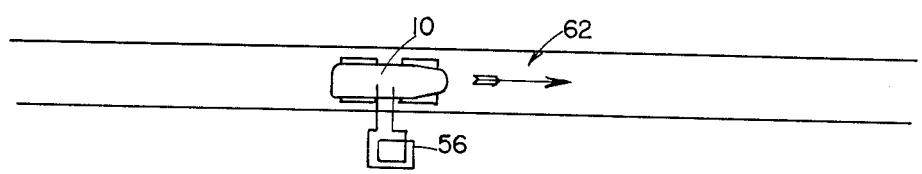
FIGURE 4 shows a roadway control system.
Figure 4:
Figure 4:
Figure 4:

In operation, by reference to FIGURE 4 wherein the highway is designated 62, the vehicle 10 and antenna 56 may pass stations such as S$^1$, S$^2$ and S$^3$ which emit waves of various frequency characteristics and those of station S$^1$ may cause the closing of relay 54 and allow the vehicle to reach about 65 miles per hour.

As the vehicle approaches station S$^2$, this station may cause a momentary opening of the relay 60, thus allowing deenergization of the system and allow contact member 30a to turn counterclockwise so that the end 130a will reach stop 46 which corresponds to 25 miles per hour and the vehicle will be held to this speed until one of the relays 54 or 55 is energized.

The vehicle running at 25 miles per hour may reach station S$^3$ which may effect the closing of relay 55 and permit speed of 45 miles per hour. Various combinations of stations may be used along the way according to the need. Even with only two relays, as shown, three speeds about 25 miles per hour can be obtained, the third above 65 is attained with both relays locked in.

It may even be desirable to provide a station with the characteristics of station S$^2$ at a point of exit from the highway so that a speed of 25 miles per hour will be the maximum that the vehicle may attain off the highway.

The present example shows the spring 45 tending to cause reduction in speed but obviously the reverse might be used so that in the absence of control energy-source the contact member 30a will move to extreme clockwise position and produce no control. With this reversal, various speed limits down to zero may be imposed on the vehicle by the mere reversal of the armature 42.

The invention claimed is:

1. In a control device for a vehicle, a speedometer having a turnable conductive hand and a scale plate, the scale plate being provided with an arcuate groove concentric with the axis about which the hand turns; an arcuate conductor in the groove and turnable about said axis and adapted to be engaged by the hand; an armature for turning the conductor and a fixed coil about the armature and spaced therefrom, a source of current connected to said coil, means for varying the resistance in the circuit between the coil and source, and a spring tending to locate the armature in a given position with respect to the coil.

2. A device as claimed in claim 1, the shape of the armature being such that the armature tends to move with respect to the coil in accordance with a change of potential applied to the coil.

3. A device as claimed in claim 2, the means for varying the resistance including a resistor having a plurality of taps to cut out a part of the resistance; relays for connecting a part of said circuit to said taps, and means responsive to a characteristic signal for selectively closing the respective relays.

4. A control as claimed in claim 3, said relays being of the locking-in type, and a normally closed relay in the circuit for opening said circuit when the locking-in relays are closed.

5. A control as claimed in claim 4, and an antenna; means for discriminating radiation received by the antenna for energizing the respective relays.

6. A control for automatically setting a vehicle brake comprising a switch having two movable elements, the position of one element being dependent on the speed of the vehicle; the second element having a coil associated therewith; a variable source of potential connected to said coil; wayside station means for varying said source of potential; means for moving the second element in the same general direction under an increase of potential to the coil as the first element moves when the speed of the vehicle is increased; means for setting said brake when the two elements become engaged; bias means for urging the second element counter to said direction; and a stop for the second element to limit motion of the second element in the counter direction.

References Cited in the file of this patent

UNITED STATES PATENTS

| | | |
|---|---|---|
| 1,368,282 | Muzzy | Feb. 15, 1921 |
| 2,025,106 | Hirshfeld | Dec. 24, 1935 |
| 2,159,405 | Schubert | May 23, 1939 |
| 2,169,268 | McCullough | Aug. 15, 1939 |
| 2,172,116 | Warren | Sept. 5, 1939 |
| 2,280,727 | Stechbart | Apr. 21, 1942 |
| 2,446,393 | Russell | Aug. 3, 1948 |
| 2,656,002 | Keeton et al. | Oct. 20, 1953 |
| 2,734,590 | Hays | Feb. 14, 1956 |
| 2,780,300 | Beyer | Feb. 5, 1957 |
| 2,803,743 | Ballerait | Aug. 20, 1957 |
| 2,804,160 | Rashid | Aug. 27, 1957 |
| 2,822,881 | Treharne | Feb. 11, 1958 |
| 2,831,546 | Henderson | Apr. 22, 1958 |
| 2,839,148 | Dowdell | June 17, 1958 |

FOREIGN PATENTS

| | | |
|---|---|---|
| 811,717 | France | Jan. 23, 1937 |